United States Patent [19]

Epstein et al.

[11] 4,332,011
[45] May 25, 1982

[54] DATA PROCESSING ARRANGEMENT INCLUDING MULTIPLE GROUPS OF I/O DEVICES WITH PRIORITY BETWEEN GROUPS AND WITHIN EACH GROUP

[75] Inventors: Richard A. Epstein, Tyngsboro; Henry A. Zannini, North Andover, both of Mass.

[73] Assignee: Cambridge Telecommunications, Inc., Burlington, Mass.

[21] Appl. No.: 130,770

[22] Filed: Mar. 17, 1980

[51] Int. Cl.³ .............................................. G06F 9/46
[52] U.S. Cl. .................................................. 364/200
[58] Field of Search ... 364/200 MS File, 900 MS File

[56] References Cited

U.S. PATENT DOCUMENTS

3,909,790  9/1975  Shapiro et al. ..................... 364/200
4,009,470  2/1977  Danilenko et al. ................. 364/200

Primary Examiner—Raulfe B. Zache
Attorney, Agent, or Firm—Peter Xiarhos

[57] ABSTRACT

A data processing arrangement including a microprocessor and a plurality of input/output devices arranged in groups in accordance with a predetermined priority scheme. Each input/output device is capable of initiating a service request via an interrupt line to the microprocessor as a result of which a machine cycle is initiated by the microprocessor in which control signals are produced by the microprocessor and applied to logic circuitry coupled to the groups of input/output devices. The logic circuitry operates to propagate a low voltage level at the output of the input/output device initiating the service request down through the lower priority groups and to change inputs of the lower priority input/output devices from normal high voltage levels to low voltage levels. Data is then applied by the input/output device initiating the service request to the microprocessor, following which a microprocessor reset instruction resets the device. In accordance with the present invention, once a given input/output device has been pre-conditioned for resetting, the microprocessor and logic circuitry operate to prevent a change in this condition by preventing a low voltage level established at the output of another input/output device in a higher-priority group subsequently initiating a service request from being propagated to the input of the lower-priority input/output device.

9 Claims, 9 Drawing Figures

DATA PROCESSING ARRANGEMENT INCLUDING MULTIPLE GROUPS OF I/O DEVICES WITH PRIORITY BETWEEN GROUPS AND WITHIN EACH GROUP

BACKGROUND OF THE INVENTION

The present invention relates to a data processing arrangement and, more particularly, to a data processing arrangement for increasing the number of peripheral input/output devices that may be used with a microprocessor.

Commercially-available microprocessors may be used with a number of peripheral input/output devices. In one particular arrangement, a microprocessor is coupled with a plurality of peripheral input/output devices connected with each other in succession to form a serial daisy chain. This serial daisy chain establishes a priority sequence with the first device in the series having the highest priority and the last device in the series having the lowest priority. Each input/output device includes an input, an output connected directly to the input of the next device, and is capable of communicating with the microprocessor by means of a common interrupt line, control lines, and a common data bus. Whenever a particular input/output device requests service, for example, to apply data (e.g., vector data) to the microprocessor, the requesting device causes its associated output to drop from a first voltage level, for example, a high voltage level, to a second voltage level, for example, a low voltage level. Simultaneously therewith, the requesting device also drops the interrupt line from a high voltage level to a low voltage level. The low voltage level at the output of the requesting input/output device is coupled to the input of the next input/output device and caused to be propagated, or rippled, down through the remaining input/output devices in the series to cause the inputs thereof to go from high to low voltage levels. The propagation of the low voltage level along the daisy chain prevents the remaining devices in the series from requesting access to the microprocessor following the higher priority device requesting service and dropping the interrupt line.

The dropping of the interrupt line by the device requesting service is noted by the microprocessor whereupon an interrupt request/acknowledge cycle or sequence is initiated for producing control signals for controlling the application of vector data by the requesting input/output device to the microprocessor. These signals also establish a fixed time period of a duration sufficient to allow the input/output devices to settle out or stabilize, due to propagation delays, as a low voltage level from a requesting input/output device propagates or ripples down through the remaining input/output devices. At the termination of this fixed time period, vector data from the requesting input/output device is applied to the microprocessor via the common data bus thereby positively placing the device "under service" and allowing the microprocessor to execute an interrupt service routine associated with the particular input/output device. Upon completion of the interrupt service routine for the "under service" input/output device, the input/output device is reset by the microprocessor. This latter operation can be readily accomplished in a two-byte reset instruction of the microprocessor. More particularly, a first microprocessor op code is applied to the data bus and decoded by all of the "out of service" input/output devices to place their outputs at high voltage levels whereby the input of the "under service" device is established at a high voltage level. A second microprocessor op code applied to the data bus is then decoded by the "under service" input/output device to reset an internal interrupt structure of the input/output device thereby to allow a subsequent interrupt operation by the input/output device.

While the arrangement as described hereinabove operates in a generally satisfactory manner, the maximum number of peripheral input/output devices which can be used with the microprocessor tends to be quite small, for example, less than ten devices. Thus, if it is desired to use ten or more peripheral input/output devices with the microprocessor, it is generally necessary to make some modification or change in the arrangement as described hereinabove. One solution which has been proposed is to increase the fixed settling time period established by the microprocessor so as to accommodate the increased number of input/output devices and the increased propagation delays. This increase in the settling time period would normally be required to deal with the situation in which two or more input/output devices simultaneously request service by simultaneously dropping the interrupt line. If the settling time in this latter situation is not increased, it is possible for a low priority device dropping the interrupt line simultaneously with a higher priority device, especially a much higher priority device, to fail to establish its input at a low voltage level (due to propagation from the output of the higher priority device) during the settling time period. As a result, two sets of vector data will be placed on the data bus simultaneously by the two input/output devices, leading to a malfunction of the system software.

A disadvantage of the above proposed solution is that an increase in the duration of the settling time period of the microprocessor to accommodate an increased number of input/output devices and associated propagation delays requires either substantial modification of the internal software of the microprocessor or the addition of substantial amounts of hardware which alters internal operations of the microprocessor. These modifications can be accomplished only at the expense of sacrificing processing or computing power of the microprocessor, that is, performance, and militates against the purpose for which the microprocessor may have been selected in the first place. An additional problem in attempting to increase the number of input/output devices usable with the microprocessor as discussed hereinabove is that it is possible for a high priority input/output device seeking service after a lower priority device has been placed "under service" by the microprocessor to alter the input voltage level of the "under service" device so that it does not recognize and decode the second reset op code from the microprocessor. As a result, the internal interrupt structure of the "under service" input/output device fails to be reset and thereby prevents input/output devices of lower priority from initiating interrupt operations.

SUMMARY OF THE INVENTION

In accordance with the present invention a data processing arrangement is provided which avoids the problems and disadvantages associated with the prior art arrangement as discussed hereinabove.

The data processing arrangement in accordance with the invention includes a plurality of groups of input- /output means and a processing means. The input/output means are arranged within each group and within the plurality of groups in accordance with a predetermined priority scheme. Each of the input/output means of each group has an input and an output and is connected to an interrupt line and a data line to the processing means. Each of the input/output means is capable of initiating a service request and, in response to initiating such a request, to cause its output to change from a first voltage level to a second voltage level and to cause the interrupt line to change from a first voltage level to a second voltage level. The processing means operates to detect a change in the voltage level of the interrupt line resulting from an input/output means initiating a service request and, in response to detecting such change, to initiate an interrupt request/acknowledge cycle and to produce control signals establishing a fixed settling time period and a data receiving period.

The data processing arrangement in accordance with the invention further includes a circuit means and a clock means. The circuit means is coupled to the processing means, to the inputs and outputs of the input/output means of the groups of input/output means and to the clock means. The circuit means is arranged to receive the aforesaid control signals produced by the processing means and a clock signal produced by the clock means. The circuit means operates in response to the aforesaid signals to propagate the second voltage level at the output of the input/output means initiating the service request to the inputs of the succeeding input/output means within the same and succeeding groups of input/output means to cause the inputs of these input/output means to be changed from the first voltage levels to the second voltage levels within a time prior to the expiration of the fixed settling time established by the processing means. The input/output means initiating the service request is operative during the data receiving period established by the processing means to provide data to the processing means via the data line.

The processing means is operative following the receipt of data from the input/output means initiating the service request to produce a reset instruction including first and second coded words for resetting the input/output means initiating the service request. Each of the input/output means is operative to receive the first coded word of the reset instruction via the data line and, with the exception of the input/output means initiating the service request, to operate in response to the first coded word to change its output from the second voltage level to the first voltage level. The circuit means is further operative to cause the input of the input/output means initiating the service request to be placed at the first voltage level.

The processing means as discussed above is further operative in the event of a service request initiated by an input/output means in a group of higher priority to disable interrupt operations and to inhibit the production of other control signals at least until the input/output means first initiating the service request has been reset. The circuit means as discussed hereinabove is further operative if, after the input of the input/output means which first initiated the service request has been placed at the aforesaid first voltage level by the circuit means, an input/output means in a group of higher priority initiates a service request and causes its output to change from the first voltage level to the second voltage level, and in the absence of control signals produced by the processing means, to prevent the second voltage level at the output of the higher priority input/output means from being propagated to, and change the voltage levels at, the inputs of the succeeding input/output means including the input/output means of lower priority which first initiated the service request. The input/output means which first initiated the service request is thereupon operative to receive the second coded word of the reset instruction from the processing means via the data line and, with its input at the first voltage level and its output at the second voltage level, to operate in response to the second coded word to be placed in a reset state.

BRIEF DESCRIPTION OF THE DRAWING

Various objects, features and advantages of a data processing arrangement in accordance with the present invention will be had from a detailed discussion taken in conjunction with the accompanying drawing in which.

DETAILED DESCRIPTION OF THE INVENTION

Figure 1:
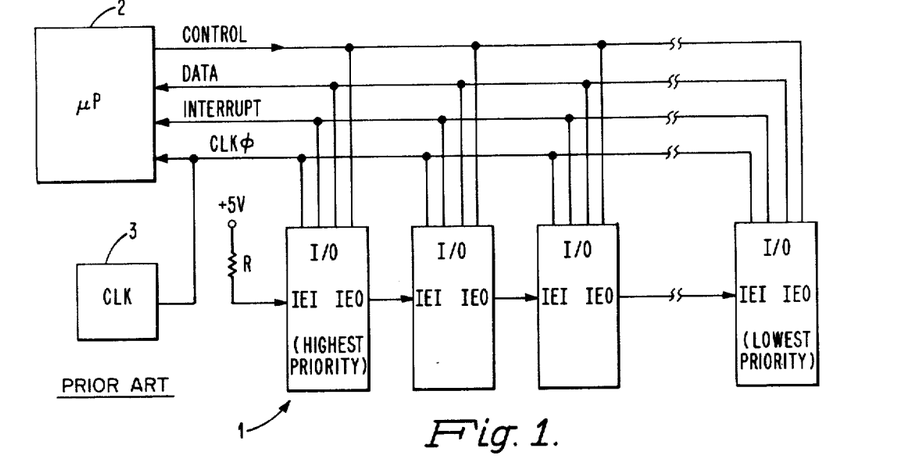
FIG. 1 is a schematic block diagram of a prior art data processing arrangement including a microprocessor and a plurality of peripheral input/output devices.

Referring now to FIG. 1, there is shown a schematic block diagram of a prior art data processing arrangement 1 of a type as previously briefly described and including a microprocessor 2 and a plurality of peripheral input/output devices I/O interconnected to form a serial daisy chain. By way of a specific example, the microprocessor 2 may be an MK3880 Z 80 microprocessor as manufactured and sold by the Mostek Corporation, Carrolton, Tex., and the input/output devices I/O may be MK3884 Z 80-SIO devices as also manufactured and sold by the Mostek Corporation. An external clock source 3 is coupled to the microprocessor 2 and the input/output devices. For an operating or clock frequency ($\phi$) of 2.5 Mhz for the abovementioned microprocessor, up to nine input/output devices I/O may be used in conjunction with the microprocessor. The MK3880 Z 80 microprocessor and the MK3884 Z 80-SIO devices are described in detail in publications entitled "Mostek 1979 Microcomputer Data Book", June, 1979 (Publication Number MK79707) and "Zilog Application Note, The Z 80 Family Program Interrupt Structure", May, 1978, and will be described herein only to the extent necessary to understand and appreciate the present invention.

As shown in FIG. 1, each of the input/output devices I/O has an interrupt enable input IEI and an interrupt enable output IEO. The output IEO of each input/output device is connected to the input IEI of the next input/output device in the daisy chain. These connections establish a priority sequence or scheme in which the first input/output device in the chain (the leftmost device in FIG. 1) has the highest priority and the last input/output device in the chain (the rightmost device in FIG. 1) has the lowest priority. In the normal "out of service" state of each input/output device, the input IEI and the output IEO are each at a high voltage level. The input IEI of the first input/output device in the daisy chain is established at the high voltage level by coupling it through a resistance R to a positive dc voltage source, for example, +5 volts.

Figure 3A:
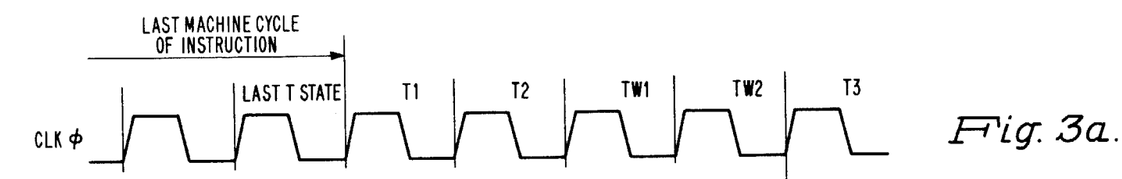
FIGS. 3a and 3f are waveforms relating to the data processing arrangements of FIGS. 1 and 2.
Figure 3B:
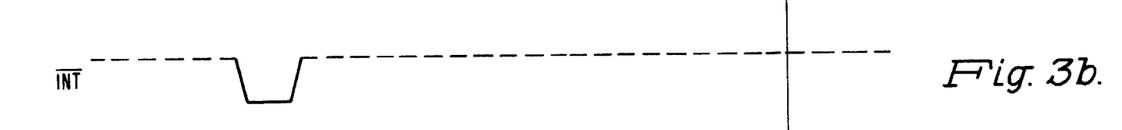
Figure 3C:
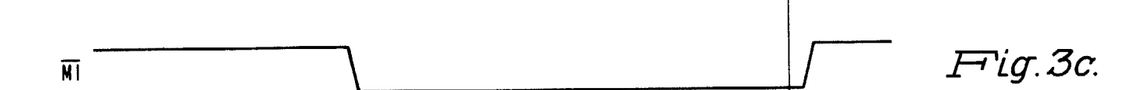
Figure 3D:
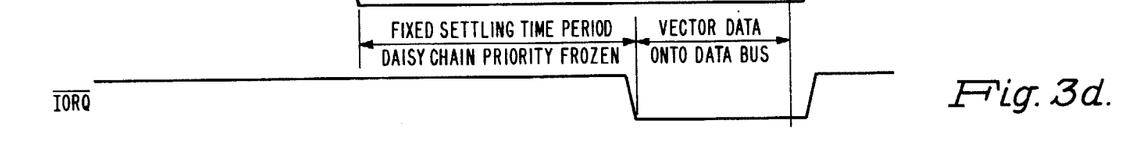
Figure 3E:
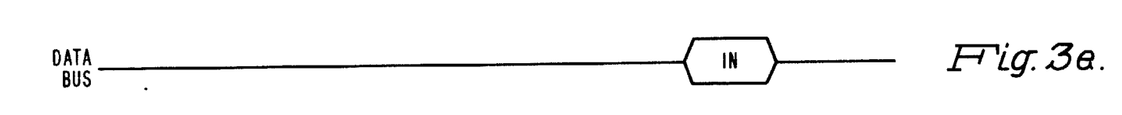

At such time as an input/output device I/O requests to be placed "under service", the device causes its output IEO to drop from its high voltage level to a low voltage level and, at the same time, causes a common INTERRUPT line to drop from a high voltage level to a low voltage level. As indicated in FIGS. 3a and 3b, the signal on the INTERRUPT LINE ($\overline{INT}$) is sampled by the microprocessor 2 with the falling edge of the last clock (last T state) at the end of an instruction. The detection by the microprocessor 2 of the signal on the INTERRUPT line causes an interrupt request/acknowledge cycle or sequence to be initiated by the microprocessor 2. During a first clock state or period T1 of the interrupt request/acknowledge cycle, a control signal $\overline{M1}$ as shown in FIG. 3c goes from a high voltage level to a low voltage level and is applied to the requesting input/output device. This signal freezes the priority status of the chain of input/output devices and remains at its low voltage level until another control signal $\overline{IORQ}$ as shown in FIG. 3d and applied to the requesting input/output device goes from a high voltage level to a low voltage level during a first wait period Tw1 of the clock cycle (FIG. 3a). The wait period Tw1, as well as an additional wait period Tw2 as shown in FIG. 3a, is automatically added to the interrupt response cycle by the microprocessor 2 to allow sufficient time for propagation delays to take place and to identify which input/output device I/O is to provide vector data to the microprocessor 2.

Between the time that the signal $\overline{M1}$ goes low and the time that the signal $\overline{IORQ}$ goes low, the low voltage level at the output IEO of the requesting input/output device I/O is coupled to the input IEI of the next input/output device, causing the voltage level at this input to go low. This low voltage level, in turn, is rippled or propagated through the next input/output device and thereafter through the remaining input/output devices in the daisy chain. A typical propagation time for each of the Mostek Z80-SIO input/output devices as mentioned hereinabove is approximately 200 nanoseconds. The time duration between the signals $\overline{M1}$ and $\overline{IORQ}$ going low accordingly represents a fixed settling time period for allowing the input/output devices to settle out due to the propagation delays. This settling time period is selected to have a value sufficient to permit a low output voltage level to be propagated from the first, or highest priority, input/output device in the chain down through the chain to the last, or lowest priority, input/output device.

Following the signal $\overline{IORQ}$ going low and until the beginning of the clock period T3, and with the input IEI of the requesting input/output device at a high voltage level, interrupt vector data (e.g., a 7 bit word) is placed by the requesting input/output device onto a common DATA bus and coupled to the microprocessor 2. The requesting input/outpt device is considered "under service" at this time and releases its hold on the INTERRUPT line for allowing interrupts from higher priority input/output devices. Lower priority input/output devices are inhibited from placing vector data on the DATA bus or interrupting because their inputs IEI are at low voltage levels at this time.

Once vector data has been communicated to the microprocessor 2 as discussed hereinabove, the microprocessor 2 utilizes this information to execute an interrupt service routine associated with the requesting, or "under service", input/output device. At the conclusion of this routine, and before the microprocessor 2 returns to the point in its operation just prior to the interrupt, the "under service" input/output device is caused to be reset to its previous state. This resetting operation is accomplished by a two-byte RETI microprocessor instruction including first and second 8-bit op codes. The first op code, specifically, a hex ED, is applied to all of the input/output devices via the DATA bus and decoded by the input/output devices which are not "under service" to place their outputs IEI at high voltage levels. The input IEI of the "under service" input/output device is at the high voltage level at this time. Following the decoding of the hex ED op code, the second op code, specifically, a hex 4D, is applied to all of the input/output devices via the DATA bus but is recognized, that is, decoded, only by the "under service" input/output device which has its output IEO at the low voltage level and its input IEI at the high voltage level. The recognition of the hex 4D op code by the "under service" input/output device causes the device to reactivate, that is, reset, its internal interrupt structure as well as to raise its output IEO to enable lower priority devices to execute interrupt operations.

The prior art arrangement 1 as discussed hereinabove and shown in FIG. 1 operates in a generally satisfactory manner. However, the maximum number of input/output device I/O which can be used with the microprocessor 2, for example, the Mostek MK3880 Z80 microprocessor, is nine (corresponding to a clock frequency, FIG. 3a, of 2.5 Mhz). Thus, if it is desired to increase the maximum number of input/output devices beyond nine, this would ordinarily require some modifications of the microprocessor 2, for example, an increase in the duration of the fixed settling period of the microprocessor, either by substantial changes in the internal software of the microprocessor or the addition of further hardware affecting internal operations of the microprocessor. Both of these solutions result in a sacrifice in the performance of the microprocessor. Further, even if the duration of the settling period of the microprocessor is increased, this change still would not provide a solution to the aforedescribed problem of a high priority input/output device requesting service after a lower priority input/output device has been placed "under service" by the microprocessor and the microprocessor is operating with its interrupts disabled. In this case, the higher priority input/output device would be permitted to initiate an interrupt operation (interrupt line goes low), change the voltage at its output from the high level to the low level and, as the low voltage level is propagated down the chain, to establish the input IEI of the lower priority input/output device at a low voltage level. The lower priority device is thereby prevented from recognizing or decoding the hex 4D op code of the RETI reset instruction. As a result, the internal interrupt structure of the lower priority input/output device would not be reset and the remaining input/output devices down the daisy chain would be prevented from initiating valid interrupt operations.

Figure 2:
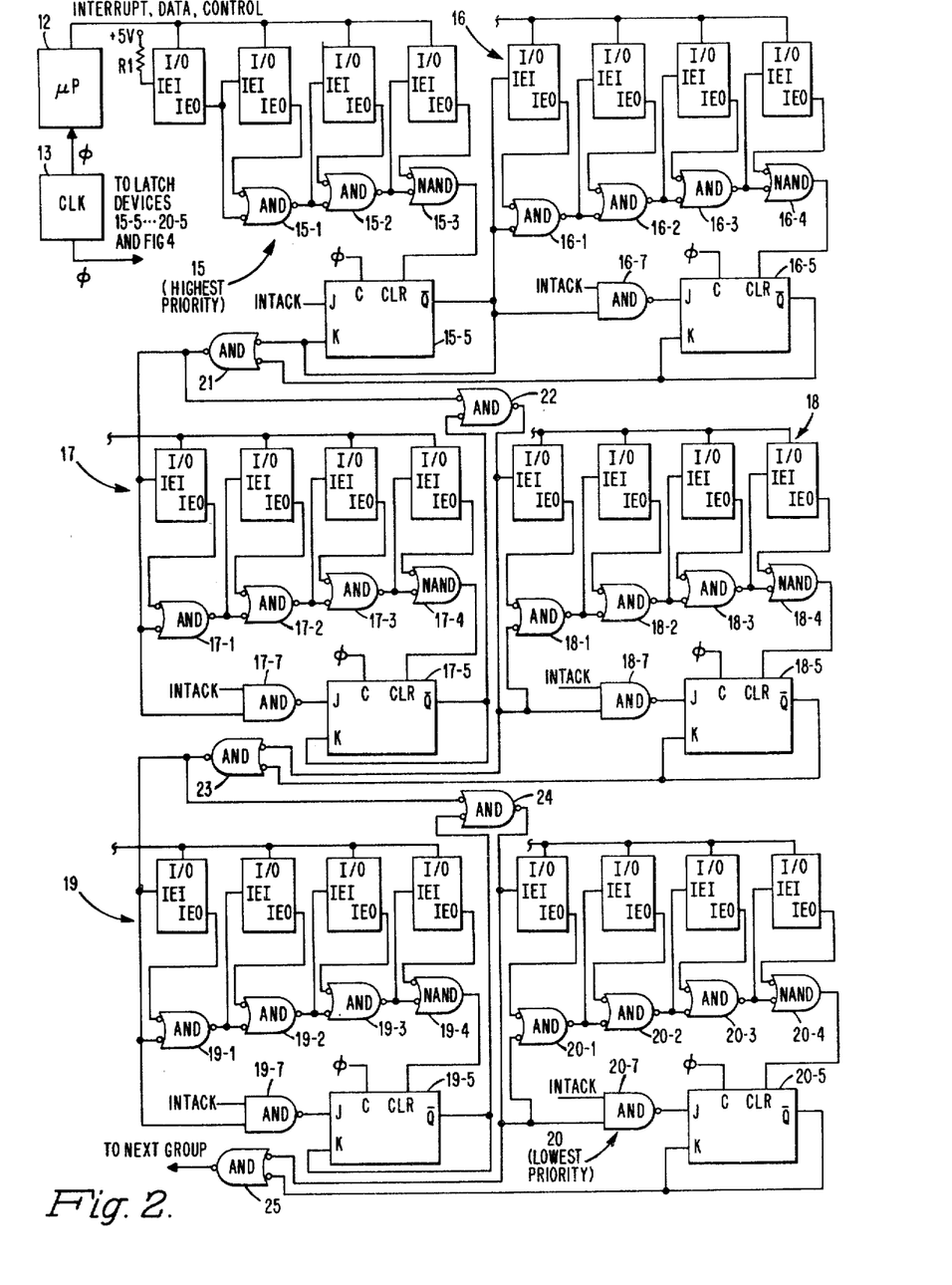
FIG. 2 is a schematic block diagram of an improved data processing arrangement in accordance with the present invention.

In accordance with the present invention, an improved data processing arrangement as shown in FIG. 2 is provided for increasing the number of peripheral input/output device I/O which may be used with a standard microprocessor 12 such as the previously described Mostek MK3880 Z80 microprocessor. This increase in the number of input/output devices, for example, from nine devices to up to 60 or more devices, can be accomplished by the present invention without changing the internal software of the microprocessor or the fixed settling time period of the microprocessor and without adding additional hardware affecting internal operations of the microprocessor. There is thus no sacrifice in processing or computing power or other performance aspects of the microprocessor.

The data processing arrangement in accordance with the present invention as shown in FIG. 2 includes a plurality of input/output devices I/O arranged in a plurality of groups 15–20 and coupled to the microprocessor 12. The input/output devices I/O and the microprocessor 12 may be of the same type as previously described, that is, Mostek MK3884 Z80-SIO input/output devices and a Mostek MK3880 Z80 microprocessor. Although six groups of input/output devices I/O are shown in FIG. 2, each having four input/output devices, it is to be appreciated that this showing is exemplary only and that up to 15 or more groups of four input/output devices could be used with the microprocessor 12 if so desired. The various input/output devices I/O as shown in FIG. 2 are coupled to the microprocessor 12 by means of a common DATA bus, a common INTERRUPT line, and control lines. For the sake of simplicity, these connections are shown combined schematically in a single bus in FIG. 2.

Each of the input/output devices I/O as shown in FIG. 2 includes, as in the previous discussion, an input IEI as an output IEO. High voltage levels are normally present at these connections when the devices are "out of service" and are subject to change when a request for service is made to the microprocessor 12, specifically, by dropping the INTERRUPT line from a high voltage level to a low voltage level. With the exception of the first group 15 of input/output devices I/O, the various groups of input/output devices are essentially the same. In the case of the first group 15, and unlike the other groups, the input IEI of the first input/output device I/O is coupled through a resistance R1 to a source of positive dc voltage, for example, +5 volts. The inputs IEI and outputs IEO of the input/output devices intermediate to the first and last input/output devices of this group are coupled to corresponding inputs of AND logic gates 15-1 and 15-2 employing negative logic. The input IEI and the output IEO of the last input/output device I/O in the group are coupled to corresponding inputs of a NAND logic gate 15-3 employing negative logic. It will be noted that the gates 15-1 to 15-3 of the group 15 are connected to each other, via their output connections as shown in FIG. 2, to form a serial chain. Similar series of AND and NAND gates 16-1 ... 16-4 to 20-1 ... 20-4 are also provided for the other groups 16-20 of input/output devices as shown in FIG. 2.

The series of AND and NAND gates as discussed hereinabove are connected to corresponding latch devices 15-5 ... 20-5. As shown in FIG. 2, each of the latch devices 15-5 ... 20-5 includes a first input CLR coupled to the output of the NAND gate of the associated group of I/O devices, a clock input C for receiving clock pulses φ from an external clock source 13, a control input J, an input K, and an output $\overline{Q}$. The clock pulses applied to the clock inputs C of the latch devices 15-5 ... 20-5 have a form such as shown in FIG. 3a. In the absence of the input/output devices I/O of a particular group being "under service", the output $\overline{Q}$ of the associated latch device is at a high voltage level; otherwise, the output $\overline{Q}$ is at a low voltage level.

As indicated in FIG. 2, the outputs $\overline{Q}$ of the plurality of latch devices 15-5 ... 20-5 are selectively connected to the input/output devices I/O and AND/NAND gates of successive groups of devices, either directly or indirectly via a plurality of AND gates 21-25 (employing negative logic) arranged in a serial chain fashion. More specifically, the output $\overline{Q}$ of the latch device 15-5 is coupled directly to the input IEI of the first input/output device of the group 16 of devices, to one input of the AND gate 16-1 and to a first input of the AND gate 21. The output $\overline{Q}$ of the latch device 16-5 is coupled to a second input of the AND gate 21, the output of which is coupled to the input IEI of the first input/output device of the group 17, one input of the AND gate 17-1 and to a first input of the AND gate 22. The output $\overline{Q}$ of the latch device 17-5 is coupled to a second input of the AND gate 22, the output of which is coupled to the input IEI of the first input/output device of the group 18, to one input of the AND gate 18-1, and to a first input of the AND gate 23. The output $\overline{Q}$ of the latch device 18-5 is coupled to a second input of the AND gate 23, the output of which is coupled to the input IEI of the first input/output device of the group 19, to one input of the AND gate 19-1, and to a first input of the AND gate 24. The output $\overline{Q}$ of the latch device 19-5 is coupled to a second input of the AND gate 24, the output of which is coupled to the input IEI of the first input/output device of the group 20, to one input of the AND gate 20-1 and to a first input of the AND gate 25. The output $\overline{Q}$ of the latch device 20-5 is coupled to a second input of the AND gate 25, the output of which is coupled to the next successive group of input/output devices and gates (not shown). Each of the latch devices 15-5 ... 20-5, which may be implemented by a flip-flop of the J-K type, further has its output $\overline{Q}$ coupled directly to its input K.

Figure 3F:
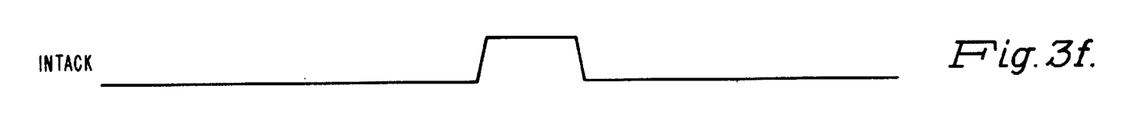

The particular operating state of any one of the latch devices 15-5 ... 20-5 at any given time, that is, whether its output $\overline{Q}$ is at a high voltage level or low voltage level, is determined by the particular operating state of an input/output device I/O of the associated group, that is, whether it is "under service" or "out of service", and also by means of a signal INTACK as employed either directly, as in the case of the latch device 15-5, or in conjunction with a corresponding one of a plurality of AND gates 16-7 ... 20-7. The INTACK signal, which is shown in FIG. 3f and which will be described in detail hereinafter, is coupled to first inputs of the AND gates 16-7 ... 20-7. A second input of the AND gate 16-7 is coupled to the output Q of the latch device 15-5 and the second inputs of the other AND gates 17-7 ... 20-7 are coupled, respectively, to the outputs of the AND gates 21-24. The outputs of the NAND gates 16-7 ... 20-7 are respectively coupled to the J inputs of the latch devices 16-5 ... 20-5.

The operation of the data processing arrangement of FIG. 2 will now be explained in detail. Three specific situations will be described, specifically, (a) a single input/output device requesting service; (b) two or more input/output devices simultaneously requesting service; and (c) a high priority input/output device requesting service after a lower priority input/output device has been placed "under service" and the microprocessor 12 is executing with its interrupts enabled.

Single Input/Output Device I/O Requests Service

At such time as an input/output device I/O (any input-

Figure 4:
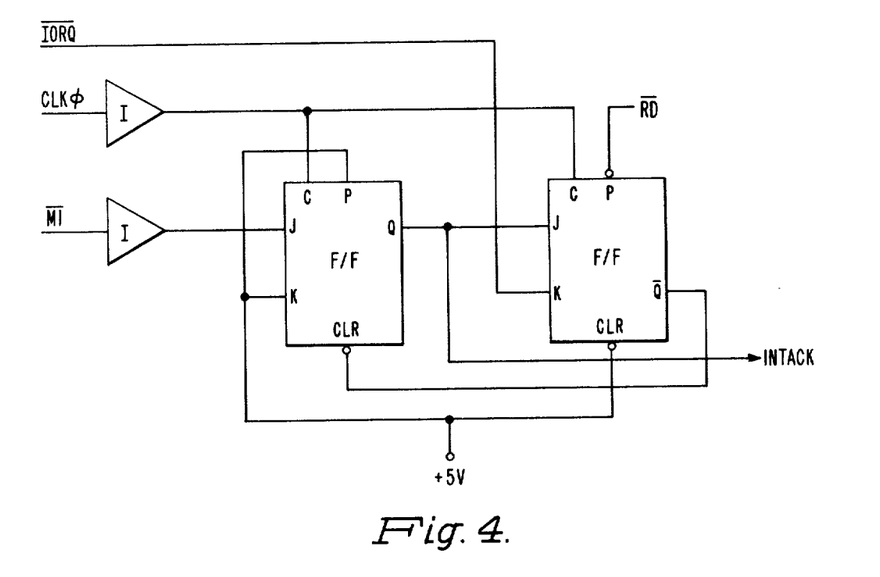
FIG. 4 is a schematic block diagram of control circuitry employed in conjunction with the data processing arrangement of FIG. 2.

/output device I/O) requests service, the input/output device operates to cause its output IEO to go from a normally high voltage level ("out of service" state) to a low voltage level and, simultaneously therewith, to cause the INTERRUPT line to drop from a high voltage level to a low voltage level. The input IEI of the input/output device is at a high voltage level at this time, either as a result of being connected to a positive dc voltage, as in the case of the first input/output device of the group 15, or as a result of the latch device of the preceding group having its output $\overline{Q}$ at a high voltage level. Assuming that the INTERRUPT line drops low prior to the falling edge of a clock pulse during the last T state of a microprocessor macro-instruction (see FIG. 3a), the signal ($\overline{INT}$) on the INTERRUPT line is detected by the microprocessor 12 and the signals $\overline{M1}$ and $\overline{IORQ}$ as shown in FIGS. 3c and 3d, respectively, are produced by the microprocessor 12, in the same manner as earlier described, and applied to flip-flop and inverter circuitry as shown in FIG. 4. During the clock state or period T2 of the clock signal, and with the signal $\overline{M1}$ at a low voltage level and the signal $\overline{IORQ}$ at a high voltage level, a signal INTACK is produced by the circuitry as shown in FIG. 4. At this time, a microprocessor read signal $\overline{RD}$ is at a high voltage level.

As the input IEO of the requesting input/output device goes from its high voltage level to its low voltage level as mentioned hereinabove, the low voltage level is caused to be propagated down through the lower priority input/output devices in the same group and the input/output devices of the other groups of lower priority and cause the inputs IEI of the lower priority input/output devices to go from high voltage levels to low voltage levels. By way of a specific example, assuming that the requesting input/output device is the second device in the first group 15, its low output voltage level is propagated in succession through the AND gates 15-1 and 15-2 thereby causing the inputs IEO of the third and fourth devices to go low and preventing interrupts by these devices. The NAND gate 15-3, the output of which is set high during the propagation action, operates, together with the INTACK signal, to cause the latch device 15-5 to change the state of its output $\overline{Q}$ from its normal ("out of service") high voltage level to its low voltage level (during the falling edge of state T2, FIG. 3h). The low voltage level at the output $\overline{Q}$ of the latch device 15-5 is applied directly to the input IEI of the first input/output device in the group 16, causing the voltage at this input to change from its high voltage level to its low voltage level and preventing an interrupt by this device, and also propagated through the AND gates 16-1, 16-2 and 16-3 causing the voltages at the inputs IEI of the second, third and fourth input/output devices in the group 16 to change from their high voltage levels to their low voltage levels and preventing interrupts by these devices.

The low voltage level at the output $\overline{Q}$ of the latch device 15-5 is also coupled in succession through the AND gates 21-25. The outputs of the AND gates 21-22 in turn initiate propagation actions within the respective groups 17-20, in the same manner as described hereinabove, to change the inputs IEI of the input/output devices in these groups, in succession, from their high voltage levels to their low voltage levels. Since each of the logic gates involved in the above propagation actions has a small inherent propagation delay, for example, 5–15 nanoseconds as compared with approximately 200 nanoseconds for each of the input/output devices I/O, the last input output device in the last group 20 changes its input IEI from its high voltage level to its low voltage level before the signal $\overline{IORQ}$ (FIG. 3d) goes from its high voltage level to its low voltage level. Thus, for the duration that the signal $\overline{IORQ}$ is at its low voltage level and vector data is to be applied to the microprocessor 12, the only input/output device which has both its input IEI at a high voltage level and its output IEO at a low voltage level, and thus qualifies to supply vector data to the microprocessor 12, is the second input/output device in the first group 15 which requested service. During the time that the signal $\overline{IORQ}$ is at its low voltage level and until the beginning of the clock period T3, the second input/output device in the group 15 supplies the vector data to the microprocessor 12. The remaining operations, including the reset operation (RETI reset instruction), are executed in the same manner as earlier described. It will be noted from the above discussion and by reference to FIG. 2 that while the latch device 15-5 has been caused to place its output $\overline{Q}$ at the low voltage level (its input J being high), the other latch devices 16-5 ... 20-5 have their outputs $\overline{Q}$ at high voltage levels (and inputs J low). However, the low voltage level at the output $\overline{Q}$ of the latch device 15-5 and the AND gates 21-25 serve to initiate the necessary propagation of the low voltage level down and through the groups of input/output devices in the manner as described hereinabove.

Two or More Input/Output Devices Simultaneously Request Service—In the event two or more input/output devices I/O simultaneously request service, specifically, by simultaneously changing their outputs IEO and the INTERRUPT line from high voltage levels to low voltage levels, the resulting operations are essentially the same as described hereinabove. More specifically, each of the requesting input/output devices will have its low voltage level at its output IEO propagated down to input/output devices of lower priority and, in the case of the lower priority requesting device, its input IEI will itself be changed from its high voltage level to its low voltage level by propagation action initiated by the higher priority requesting device. By way of specific example, if the second input/output device of the group 15 requests service simultaneously with the third input/output device in the last group 20, the devices will have the low voltage levels at their outputs IEO propagated down to lower priority devices to change their inputs IEI from high to low voltage levels and prevent interrupts by the lower priority devices, and the third input/output device in the group 20 will itself have its input IEI changed from the high voltage level to the low voltage level by the propagation action initiated by the second input/output device in the group 15. In this case, because of the very short propagation delays associated with the various logic gates involved in the propagation actions, the input IEI of the third input/output device in the group 20 goes from its high voltage level to its low voltage level at a time before the signal $\overline{IORQ}$ goes from its high voltage level to its low voltage level. As a result, during the time that the signal $\overline{IORQ}$ is at its low level the only input/output device which simultaneously has its input IEI at a high voltage level and its output IEO at a low voltage level and qualifies to supply vector data to the microprocessor 12 is the second input/output device in the group 15. This vector data is supplied to the microprocessor 12 during the time that the signal $\overline{IORQ}$ is at its low voltage level, as previously described.

High Priority Input/Output Device Requests Service After a Lower Priority Input/Output Device Has Been Placed "Under Service" and the Microprocessor has Interrupts Enabled—In the event an input/output device I/O requests service after a lower priority input/output device I/O has been placed "under service", that is, vector data has been supplied by the lower priority input/output device to the microprocessor, it is a requirement that the higher priority device be prevented from altering the voltage level at the input IEI of the lower priority device so that the lower priority device is unable to recognize and decode the reset instruction issued by the microprocessor 12 for resetting the internal interrupt structure of the lower priority device. This situation can best be understood by considering a specific example in which an input/output device, for example, the second input/output device in the first group 15, requests service after a lower priority device, for example, the third input/output device in the group 20, has already been placed "under service" by the microprocessor, in the manner as earlier described in detail. In this specific example, and as earlier described, the third input/output device in the group 20 can reset its internal interrupt structure only if its input IEI at at a high voltage level while its output IEO is simultaneously at a low voltage level. The input IEI of the third input/output device in the group 20 is established at the high voltage level as a result of higher priority input/output devices recognizing and decoding the hex ED op code of a RETI instruction and placing their outputs IEO at high voltage levels. If, following this decoding operation, a low voltage level at the output IEO of the second input/output device in the group 15 is permitted to propagate down to the third input/output device in the group 20 and change the voltage at the input IEI of the third input/output device from its high level to its low level, the third input/output device will be prevented from recognizing and decoding the hex 4D op code of the RETI instruction. This undesirable result is prevented in accordance with the present invention by utilizing signals produced by the microprocessor 12 for generating an INTACK signal following the request for service by the third input/output device in the group 20 and not generating a subsequent INTACK signal when the second input/output device in the group 15 requests service. In this specific situation, the AND gate 20-7 associated with the group 20 responds to the INTACK signal to cause the input J of the latch device 20-5 to be at a high voltage level and the output $\overline{Q}$ of the latch device 20-5 to change from its high voltage level to its low voltage level. The latch device 15-5 of the group 15 responds to the absence of the INTACK signal to place its input J at a low voltage level and to prevent the voltage level at its output $\overline{Q}$ from changing from its high value to its low value, thereby preventing the propagation of a low voltage level down through the lower priority input/output devices to the input IEI of the third input/output device in the group 20. Further, in the above situation, the AND gate 16-7 associated with the group 16 operates to prevent the latch device 16-5 from changing the voltage level at its output $\overline{Q}$ from its high value to its low value, in turn preventing similar changes in the outputs $\overline{Q}$ of latch devices associated with the lower priority groups 17-20. In the normal situation in which an input/output device in the group 15 properly requests service and the output $\overline{Q}$ of the associated latch device 15-5 is established at its low voltage level, the AND gate 16-7 and the NAND gate 16-4 will establish the proper inputs to the latch device 16-5 to permit its output $\overline{Q}$ to change from the high voltage level to the low voltage level.

From the above discussion, it is believed that it will be apparent that by the use of simple logic gates and components as discussed hereinabove the number of input/output devices I/O usable with the microprocessor 12 can be substantially increased. In addition, problems with propagation delays are avoided, and no internal changes in the software of the microprocessor 12 or addition of hardware affecting internal operations of the microprocessor 12 are required. The circuitry of the invention further permits processing of service requests initiated by multiple input/output devices I/O, either simultaneously or successively, while insuring proper resetting of input/output devices.

While there has been described what is considered to be a preferred embodiment of the invention, it will be apparent to those skilled in the art that various changes and modifications may be made therein without departing from the invention as called for in the appended claims.

What is claimed is:

1. A data processing arrangement comprising:
   a plurality of groups of input/output means arranged within each group and within the plurality of groups in accordance with a predetermined priority scheme, each of the input/output means of each group having an input and an output and being connected to an interrupt line and a data line, each of the input/output means of each group being capable of initiating a service request and, in response to initiating such a request, to cause its output to change from a first voltage level to a second voltage level and to cause the interrupt line to change from a first voltage level to a second voltage level;
   processing means coupled to the interrupt and data lines to the input/output means of the groups of input/output means and operative to detect a change in the voltage level of the interrupt line resulting from an input/output means initiating a service request and, in response to detecting such change, to initiate an interrupt request/acknowledge cycle and to produce control signals establishing a fixed settling time period and a data receiving period;
   clock means coupled to the processing means and operative to produce a clock signal;
   circuit means coupled to the processing means, to the inputs and outputs of the input/output means of the groups of input/output means and to the clock means and arranged to receive the aforesaid control signals produced by the processing means and the clock signal produced by the clock means, said circuit means being operative in response to said signals to propagate the second voltage level at the output of the input/output means initiating the service request to the inputs of the succeeding input/output means within the same and succeeding groups of input/output means to cause the inputs of said input/output means to be changed from the first voltage levels to the second voltage levels within a time prior to the expiration of the fixed settling time period established by the processing means, said input/output means initiating the service request being operative during the data receiving period established by the processing means to provide data to the processing means via the data line;

said processing means being operative following the receipt of data from the input/output means initiating the service request to produce a reset instruction including first and second coded words for resetting the input/output means initiating the service request;

each of the input/output means being further operative to receive the first coded word of the reset instruction via the data line and, with the exception of the input/output means initiating the service request, to operate in response to the first coded word to change its output from the second voltage level to the first voltage level, and said circuit means being operative to cause the input of the input/output means initiating the service request to be placed at the first voltage level;

said processing means being further operative in the event of a service request initiated by an input/output means in a group of higher priority to disable interrupt operations and to inhibit the production of other control signals at least until the input/output means first initiating the service request has been reset; and said circuit means being further operative if, after the input of the input/output means which first initiated the service request has been placed at the aforesaid first voltage level by the circuit means, an input/output means in a group of higher priority initiates a service request and causes its output to change from the first voltage level to the second voltage level, and in the absence of control signals produced by the processing means, to prevent said second voltage level at the output of the higher priority input/output means from being propagated to, and change the voltage levels at, the inputs of the succeeding input/output means including the input/output means of lower priority which first initiated the service request;

said input/output means which first initiated the service request being thereupon operative to receive the second coded word of the reset instruction from the processing means via the data line and, with its input at the first voltage level and its output at the second voltage level, to operate in response to the second coded word to be placed in a reset state.

2. A data processing arrangement in accordance with claim 1 wherein:

the plurality of groups of input/output means are arranged in descending priority, and the input/output means of each group are arranged in descending priority.

3. A data processing arrangement in accordance with claim 2 wherein:

the processing means is operative in response to detecting a change in the voltage level of the interrupt line resulting from an input/output means initiating a service request to initiate an interrupt request/acknowledge cycle and to produce first and second control signals each including a first transition from a first voltage level to a second voltage level and a second, subsequent transition from the second voltage level to the first voltage level, the first transition of the second control signal occurring at a time after the first transition of the first control signal and defining a time period between the first transitions of the first and second control signals representing a fixed propagation settling time period, and the time period between the first and second transitions of the second control signal including a period representing a data receiving period for the processing means to receive data from an input/output means which initiated a service request and changed the voltage level at its output and the interrupt line.

4. A data processing arrangement in accordance with claim 2 wherein the circuit means comprises:

a plurality of logic gate means associated with each group of input/output means and connected with each other in a series fashion and selectively connected between inputs and outputs of the input/output means in the groups for propagating a second voltage level at the output of an input/output means in the group to succeeding input/output means in the group and through the logic gate means to an output of the series of logic gate means.

5. A data processing arrangement in accordance with claim 4 wherein the circuit means further comprises:

a plurality of latch means each associated with a different one of the plurality of groups of input/output means and having a clock input coupled to the clock means for receiving the clock signal produced by the clock means, a first input coupled to the output of the plurality of logic gate means associated with the particular group, a second input, and an output coupled to the input of the first, highest priority input/output means in each lower priority group of input/output means and to an input of the first logic gate means in the series of logic gate means associated with each lower priority group of input/output means, said latch means having a first operating state during which its output is established at the first voltage level and a second operating state during which its output is established at the second voltage level; and input means coupled to the second inputs of the plurality of latch means and to the processing means, said input means being operative if the processing means produces control signals during an interrupt request/acknowledge cycle to receive said signals and to establish the first inputs of the latch means at a first voltage level and operative in the absence of control signals produced by the processing means to establish the first inputs of the latch means at a second voltage level;

each of said latch means being operative if the plurality of logic gate means connected to its first input has propagated a second voltage level as established at the output of an input/output means of the associated group of input/output means and, in addition, the second input has been established at the first voltage level by the input means, to establish its output at the second voltage level whereby the first voltage level propagated by the associated plurality of logic gate means and also present at its output is permitted to be propagated to lower priority groups of input/output means and logic gate means, and further operative if the plurality of logic gate means connected to its first input has propagated a second voltage level as established at the output of an input/output means of the associated group of input/output means and, in addition, the second input has been established at the second voltage level by the input means, to establish its output at the first voltage level whereby the first voltage level propagated by the associated plurality of logic gate means is prevented from being propagated to lower priority groups of input/output means and logic gate means.

6. A data processing means in accordance with claim 4 wherein:
   the circuit means includes means connecting the input of the first, highest priority input/output means of the first, highest priority group of input/output means to a voltage source; and
   the plurality of logic gate means associated with the aforesaid first group of input/output means includes a series of logic gates each having a pair of inputs connected between the input and output of a different one of the remaining input/output means of the first group, each of said logic gates with the exception of the last logic gate in the series having an output connected to the input of the next input/output means and to an input of the next logic gate in the series for propagating a second voltage level at the output of the associated input/output means to the input of the next input/output means and to the input of the next logic gate in the series.

7. A data processing arrangement in accordance with claim 6 wherein:
   the plurality of logic gate means associated with each of the groups of input/output means of lower priority and following the first, highest priority group of input/output means includes a series of logic gates each having a pair of inputs connected between the input and output of a different one of the input/output means in the group, each of said logic gates with the exception of the last logic gate in the series having an output connected to the input of the next input/output means and to an input of the next logic gate in the series for propagating a second voltage level at the output of the associated input/output means to the input of the next input/output means and to the input of the next logic gate in the series.

8. A data processing arrangement in accordance with claim 7 wherein the circuit means further comprises:
   a plurality of latch means each associated with a different one of the plurality of groups of input/output means and having a clock input coupled to the clock means for receiving the clock signal produced by the clock means, a first input coupled to the output of the last logic gate of the series of logic gates associated with the particular group, a second input, and an output coupled to the input of the first, highest priority input/output means in each lower priority group of input/output means and to an input of the first logic gate in the series of logic gates associated with each lower priority group of input/output means, said latch means having a first operating state during which its output is established at the first voltage level and a second operating state during which its output is established at the second voltage level; and
   input means coupled to the second inputs of the plurality of latch means and to the processing means, said input means being operative if the processing means produces control signals during an interrupt request/acknowledge cycle to receive said signals and to establish the second inputs of the latch means at a first voltage level and operative in the absence of control signals produced by the processing means to establish the first inputs of the latch means at a second voltage level;
   each of said latch means being operative if the series of logic gates including the last logic gate connected to its first input has propagated a second voltage level as established at the output of an input/output means of the associated group of input/output means and, in addition, the second input has been established at the first voltage level by the input means, to establish its output at the second voltage level whereby the first voltage level propagated by the associated series of logic gates and also present at its output is permitted to be propagated to lower priority groups of input/output means and series of logic gates, and further operative if the series of logic gates including the last logic gate connected to its first input has propagated a second voltage level as established at the output of an input/output means of the associated group of input/output means and, in addition, the second input has been established at the second voltage level by the input means, to establish its output at the first voltage level whereby the first voltage level propagated by the associated series of logic gates is prevented from being propagated to lower priority input/output means and series of logic gates.

9. A data processing arrangement in accordance with claim 8 wherein:
   the output of each of the plurality of latch means is coupled to the input of the first, highest priority input/output means in each lower priority group of input/output means and to an input of the first logic gate in the series of logic gates associated with each lower priority group of input/output means by means of an additional plurality of logic gates arranged in series and each having a connection to a corresponding group of input/output means and associated series of logic gates.

* * * * *